United States Patent [19]

Hardwick

[11] Patent Number: 4,756,464
[45] Date of Patent: Jul. 12, 1988

[54] METHOD OF MANUFACTURE OF COMPOSITE LAMINAR METAL PLATE

[75] Inventor: Roy Hardwick, Troon, Scotland

[73] Assignee: Imperial Chemical Industries PLC, London, England

[21] Appl. No.: 914,161

[22] Filed: Oct. 1, 1986

[30] Foreign Application Priority Data

Oct. 30, 1985 [GB] United Kingdom ............... 8526786

[51] Int. Cl.[4] ............................................. B23K 20/08
[52] U.S. Cl. ..................................... 228/107; 228/2.5
[58] Field of Search ................ 228/2.5, 107, 108, 109

[56] References Cited

U.S. PATENT DOCUMENTS

| | | | |
|---|---|---|---|
| 3,233,312 | 2/1966 | Cowan et al. | 228/109 |
| 3,281,930 | 11/1966 | Fordham | 228/107 |
| 3,728,780 | 4/1973 | Chang | 228/109 |
| 4,612,259 | 9/1986 | Ueda | 228/107 |

FOREIGN PATENT DOCUMENTS 1294522 11/1972 United Kingdom .

*Primary Examiner*—M. Jordan
*Attorney, Agent, or Firm*—Cushman, Darby & Cushman

[57] ABSTRACT

An improved method is described for metallurgically bonding a composite metal plate (from which structural transition joints may be cut) wherein an outer layer and a metal interlayer of a different composition are propelled towards a metal base layer by means of the detonation of a layer of explosive disposed adjacent to the outer surface of the outer layer. The interlayer is only 0.25 to 4 mm thick and it is initially disposed at a stand-off distance from the base layer not exceeding 6 mm or 8 times the interlayer thickness. The outer layer has a mass of at least twice the mass of the interlayer and it is initially separated from the interlayer by a stand-off distance which is 0.5 to 10 times the thickness of the outer layer and is at least 3 times the distance between the base layer and the interlayer.

12 Claims, 2 Drawing Sheets

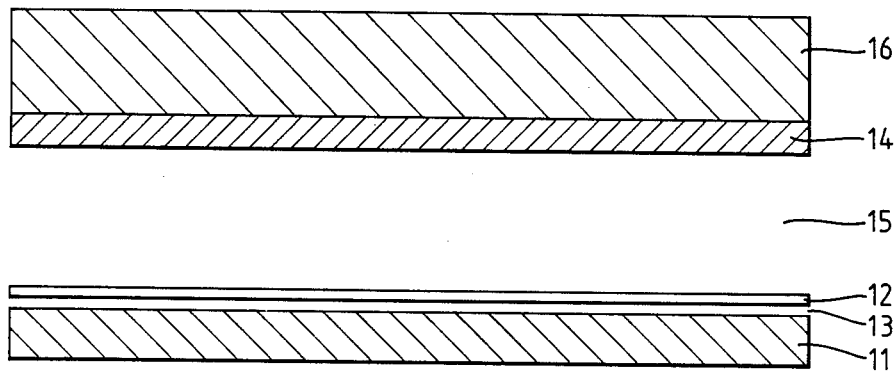
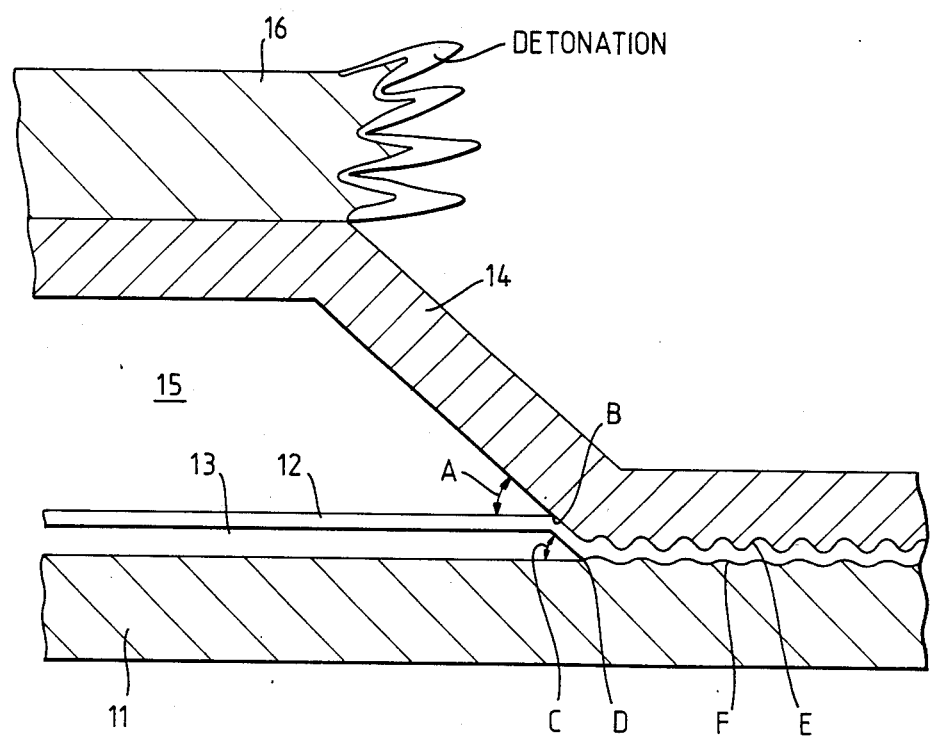

METHOD OF MANUFACTURE OF COMPOSITE LAMINAR METAL PLATE

This invention relates to an improved method of manufacturing explosively bonded composite laminar metal plate from which bars may be cut to provide structural transition joints suitable for fusion welding between metal structural elements. Such joints are advantageously used, for example, to join lightweight aluminium alloy superstructures to the steel hulls of marine vessels, where fusion welding is not practicable due to the large difference in melting point between the steel and the aluminium alloy. In this case the transition joint comprises an outer layer of steel which can be readily fusion welded to the steel hull and an outer layer of aluminium alloy which can be similarly welded to the superstructure.

The manufacture of aluminium/steel transition joints joining aluminium to carbon steel and low-alloy steels containing less than 5% alloying elements by weight has been described in U.S. Pat. No. 3,583,062 and involves propelling together at least one layer of aluminium or aluminium alloy and a layer of steel by means of a layer of explosive, disposed adjacent the outer surface of one of the layers, detonating at a velocity of 2500 to 3400 meters/second. In order to obtain a desirable wavy bond between the layers the explosive velocity and the initial stand-off distances between the layers are selected to provide an optimum impact angle which, for aluminium projected against steel, is 14° to 25°. In practice this means that an aluminium layer driven against a steel surface is disposed at an initial stand-off distance which is 1 to 6 times the thickness of the driven layer and is usually 30 to 60 mm.

In the commercial practice of the prior art method for making steel/aluminium alloy composites, it is usual to have an interlayer of substantially pure aluminium between the selected aluminium alloy and the steel because direct bonding of the alloy and steel is difficult to achieve consistently due to of the adverse effect of metals such as magnesium which is normally present in the aluminium alloy. Such three layer composites may be made by bonding the two interfaces with two separate explosions but more usually both interfaces are bonded in a single step with only one explosive charge which on detonating, drives the aluminium containing layers towards the steel. In this preferred single step bonding method the pure aluminium interlayer is initially placed parallel to a steel baseplate at the recommended stand-off distance of 30 to 60 mm and the layer of aluminium alloy is placed parallel to the interlayer, again with a substantial but smaller stand-off gap of 3 to 6 mm. The steel base is laid on the ground or on a steel anvil and a layer of explosive having a detonation velocity of 2500 to 3400 meters/sec. is placed over the outer surface of the layer of aluminium alloy at a loading of about 5 to 10 g/cm$^2$. On detonating the explosive the aluminium alloy layer is progressively deformed against the pure aluminium interlayer forming a first collision front which traverses the surface of the interlayer at the detonation velocity of the explosive. Thus a first bond is formed between the aluminium alloy and the interlayer. Because the interlayer is substantially unsupported 30 to 60 mm above the steel plate, the interlayer is also progressively deformed to give a further collision front between the interlayer and the steel whereby the interlayer becomes bonded to the steel layer. However, although the three layers are bonded by a single explosion, there are, in fact, two sequential bonding operations separated by a time interval of a few microseconds. Because the two bonds are fabricated sequentially and separately, the bonding parameters for obtaining the first bond between the aluminium alloy and pure aluminium interlayer impose dimensional constraints upon the thickness of these two components. In order to achieve a bond there must be an interfacial collision pressure which exceeds the yield strength of the components by a significant amount. This collision pressure is primarily a function of the momentum of the driven layer. As such, the mass and the velocity of the aluminium alloy layer are the significant factors. A second factor governing the collision pressure is the inertia of the static interlayer, which depends on the mass of the interlayer and its supporting medium. Since the interlayer is unsupported some 30–60 cm above the surface of the steel layer, the mass, and consequently the thickness, of the interlayer must be substantial relative to the aluminium alloy layer, in order to ensure that the collision pressure is sufficient for bonding. In practice the interlayer is about twice the thickness of the aluminium alloy outer layer. This requirement for a relatively thick interlayer as compared to the outer alloy layer means (a), that the transition joints have less than optimum strength because of the disproportionally large thickness of the weaker aluminium interlayer, and (b), there is a minimal amount of the stronger alloy layer available for fusion welding which can lead to difficulties in subsequent fabrication operations where an outflow of molten pure aluminium into a fused joint can adversely affect the integrity of the joint.

It is an object of this invention to provide an improved single step method of manufacturing metallurgically bonded composite metal plates whereby a metal base layer, a metal outer layer of a different composition from the base layer and a metal interlayer having a composition different from both the base and outer layers can be satisfactorily bonded to provide stronger structural transition joints.

We have discovered that such a composite plate may be advantageously made with a very thin metal interlayer and a relatively thick outer layer, if the thin interlayer is initially placed at a very small stand-off distance from the base layer, the outer layer then being placed at an appropriate larger stand-off distance from the interlayer as required to give the required impact angle for bonding. The base layer may require to be placed on an anvil which may be the ground, in order to ensure that the combined mass of the base layer and anvil is sufficient to provide the necessary inertia for bonding. As in the prior art method the explosive layer is placed on the outer surface of the outer layer and, on detonation of the explosive, the outer layer is deformed to collide progressively with the interlayer. Because of the respective proportions of the outer layer and the interlayer, the momentum of the outer layer is proportionately large and the low mass of the thin interlayer provides little inertia with little impedance to the progress of the outer layer. As a result, there is insufficient collision pressure for welding of the two layers upon their initial impact.

The interlayer, upon impact of the outer layer, is deformed progressively to assume an angle coincident to that of the deformed outer layer. Because of the small interfacial gap between the interlayer and the base layer a second collision front between the interlayer and the base layer is now generated almost immediately after the first collision between the outer layer and the interlayer occurs. Thus the two collision fronts progress across the area of the layers essentially simultaneously, the first collision front almost overlying the second collision front. Because of the substantial mass and high inertia of the base layer, a substantial collision pressure is now generated at both collision fronts producing a weld at both interfaces simultaneously. A notable result of this is that the wavelength at each interface is the same with the waves being synchronous, whereas in the previous method the waves were non-synchronous, the wavelength at the base layer/interlayer interface being longer than that at the interlayer/outer layer interface.

It is apparent that in the method of this invention it is advantageous to minimise the thickness of the interlayer in order to reduce its mass and inertia. Welding of the interlayer and the outer layer is thus actively prevented upon the initial impact and there is minimal impedance and reduction of the velocity of the outer aluminium layer upon this initial impact. This is in direct contrast with previous practice which required to have a greater thickness of the interlayer to provide the necessary mass and inertia to give a collision pressure sufficient to generate a weld immediately upon impact of the outer layer and the interlayer. Thus the essential differences between the method of this invention and the previous method is that in the previous method two welds were formed independently and sequentially using an outer layer which was generally substantially thinner than the interlayer, whereas in our improved method the two welds are formed simultaneously using a thin interlayer and a much thicker outer layer. Our method gives stronger bonding and stronger transition joints.

Our method has the further important practical advantage that it reduces the incidence of inferior bonding due to surface undulations, or 'out of flatness' of the metal layers. In the previous method such 'out of flatness' is particularly serious at the interface between the interlayer and the outer layer where, because the gap is relatively small, the gap variations may be a significant proportion of the nominal gap. As a result, the collision front, in the dynamic situation, is no longer uniform but becomes retarded beneath the area of higher stand-off due to the longer time interval taken to travel the greater distance before impact. If this time interval is too prolonged, a situation arises where the collision front on either side can reach an area of lower stand-off some distance ahead of the higher stand-off area which may be encircled, thereby encapsulating an air bubble beneath a higher stand-off area. Other factors, for example a more rigid stand-off device of supporting medium used initially to contrive the stand-off gap, can also exacerbate the problem if it lies within the area of higher stand-off. When this encapsulation occurs, adiabatic compression arises elevating the entrapped air temperature to a point where the surrounding metal becomes molten and the air can escape through the molten metal in the outer layer. This frequently occurs when the outer layer is a thin layer of aluminium alloy and is generally referred to as a 'blow out'. In our improved method, since the stand-off between the interlayer and the outer layer is greater and the outer layer is substantially thicker and more rigid, out of flatness variations are consequently much less frequent, can be more readily controlled and are less likely to cause air encapsulation. Even in the event of encapsulation of air, the air temperature is unlikely to rise to a point where the full thickness of the outer layer becomes molten to allow a 'blow out' to occur. The normal out of flatness of the thinner interlayer is not significant in the improved method because the surface contour of the interlayer is forced to conform to that of the thicker outer layer. It is therefore only necessary to maintain flatness within prescribed dimensions which will ensure the stand-off gaps remain within the prescribed limits. The collision front at the base layer/interlayer interface will consequently be as uniform as that at the other interface. In accordance with the invention, in a method of metallurgically bonding a composite laminar metal plate comprising a metal base layer, an outer metal layer and a metal interlayer, the said layers having different compositions and said outer layer and said interlayer having an elongation of at least 15%, in which method the said layers are initially disposed substantially parallel to and separated from each other, the base layer being optionally supported on an anvil and being of a mass such that the combined mass of the base layer and the anvil (when present) is at least 4 times that of the combined mass of the outer layer and interlayer, and a layer of detonating explosive having a velocity of detonation in the range from 1500 to 3500 meters/sec is disposed adjacent to the outer surface of the outer layer and detonated thereby forming progressive collision fronts between the said layers moving at the velocity of the detonation, the interlayer has a thickness of 0.25 to 4 mm and is initially disposed at a stand-off distance from the base layer not exceeding 6 mm and not exceeding 8 times the thickness of the interlayer, and the outer layer has a mass of at least twice the mass of the interlayer and is initially separated from the interlayer by a stand-off distance which is 0.5 to 10 times the thickness of the outer layer and is at least 3 times the stand-off distance between the base layer and the interlayer. The metals in the metal layers may conveniently include aluminium and aluminium alloys, steel, titanium, and/or silver.

The invention is especially useful for preparing composite plates for the aforementioned transition joints comprising a base layer of carbon steel or low-alloy steel containing less than 5% alloying element by weight, an aluminium alloy outer layer and an interlayer of aluminium. In the bonding of such a composite plate in accordance with the invention preferably the base layer is a layer of steel, the interlayer is a layer of aluminium or aluminium alloy having a yield strength not exceeding 17,000 psi, the outer layer is a layer of aluminium alloy having a yield strength exceeding 17,000 psi and the explosive has a velocity of detonation in the range from 2500 to 3400 meters/sec, the interlayer having a thickness of 0.5 to 3.5 mm and being initially disposed at a stand-off distance from the base layer in the range from 1.5 to 3.5 mm and the outer layer being initially separated from the interlayer by a stand-off distance which is 1 to 6 times the thickness of the outer layer. Conveniently the outer layer is from 7 to 20 mm thick and is placed at a stand-off distance of 20 to 50 mm from the interlayer.

The invention is further illustrated by the following description of the manufacture of metallurgically bonded laminar composites which is described with reference to the accompanying drawings wherein FIG. 1 shows diagrammatically in section a side view of an assembly of metal layers and a layer of explosive before an explosive bonding operation in accordance with the invention;

FIG. 2 shows diagrammatically in section on a larger scale a side view of a portion of the assembly of FIG. 1 during the explosion;

In the drawings the same numeral is used to designate like elements.

Figure 3:
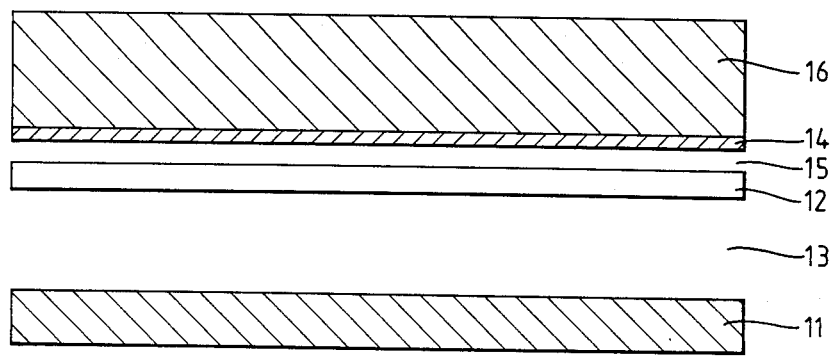
FIG. 3 shows diagrammatically in section a side view of an assembly of metal layers and a layer of explosive before an explosive bonding operation as practised hitherto.

As shown in FIGS. 1 and 2 in the method of the invention a steel baseplate 11 is laid on a rigid anvil plate (not shown) and a thin interlayer 12 of pure aluminium is supported by small spacer elements (not shown) above the steel plate 11 and parallel thereto with a small uniform stand-off gap 13 between the interlayer 12 and the plate 11. An aluminium alloy plate 14, which is much thicker than the interlayer 12, is supported above, and parallel to the interlayer 12 by spacer elements (not shown) with a uniform stand-off gap 15 between the interlayer 12 and plate 14, the gap 15 being much larger than gap 13. A layer of explosive 16 having a velocity of detonation in the range from 2500 to 3400 meters/sec is placed on the upper surface of the aluminium alloy plate 14. When the explosive 16 is detonated the plate 14 is deformed to collide progressively with the interlayer 12 at a collision angle A (FIG.2). Because the interlayer 12 provides little impedance to the movement of the deformed plate 14 there is only small collision pressure on the initial impact and no bonding occurs at the collision zone B (FIG.2).

Following impact by the alloy plate 14 the interlayer 12 is progressively deformed to collide progressively with the steel plate 11 at an angle C which is essentially the same value as angle A, the progressive collision front being almost coincident with the progressive collision front between alloy plate 14 and the interlayer 12. The steel plate 10 provides high impedance to the movement of the plate 14 and interlayer 12 and the high collision pressure now generated at collision zones B and D produces strong wavy bonds E and F of equal wavelength simultaneously at the interlayer 12/plate 14 interface and the interlayer 12/plate 11 interface. Because of the wide differential between the yield strengths of aluminium and steel the wavy bond F has a smaller amplitude than the wavy bond E.

Figure 4:
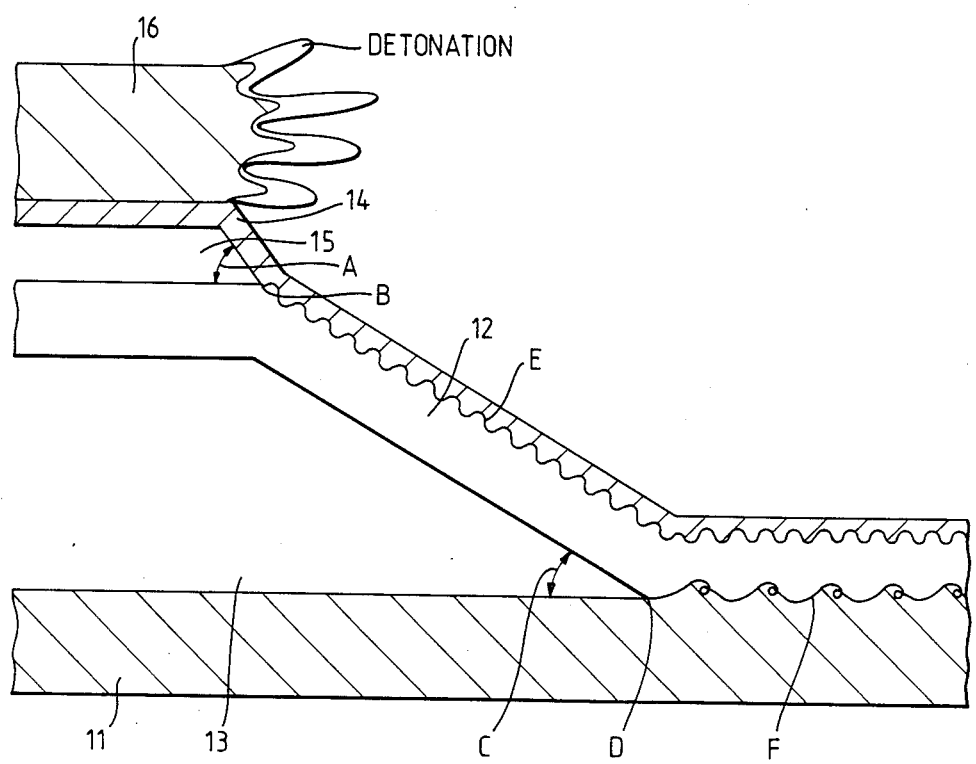
FIG. 4 shows diagrammatically in section on a larger scale a side view of a portion of the assembly of FIG. 3 during the explosion.

In the previous method of forming a bonded composite shown in Figs. 3 and 4, a steel plate 11, an interlayer 12 of pure aluminium, an aluminium alloy plate 14 and an explosive layer 16 are assembled in a similar manner to the assembly of FIG. 1 except that the stand-off gap 13 between the steel plate 11 and the interlayer 12 is much larger than the gap 15 between the interlayer 12 and the aluminium alloy 14 and the interlayer 12 is substantially thicker than the aluminium alloy plate 14. When the explosive 16 is detonated the alloy plate 14 is deformed to collide progressively with the interlayer 12 at a collision angle A but, in this case, the interlayer has sufficient mass and interia to generate sufficient collision pressure for welding to occur and a wavy bond E is formed immediately at the collision zone B. The bonded composite of plate 14 and interlayer 12 is further propelled towards the steel plate 11 and is deformed to collide with plate 11 at a collision angle C which is now lower, than the value of angle A. This second collision front follows at a significant distance behind the collision front between the plate 14 and the interlayer 12 and forms a wavy bond F at the collision zone D between the interlayer 12 and the steel plate 11. Because of the lower collision angle C the bond F has a longer wavelength than bond E.

The practice of the invention is illustrated by the following specific Examples wherein all parts and percentages are given by weight.

EXAMPLE 1

In this Example a composite laminar plate for transition joints as made using the following materials which were initially assembled as shown in FIG. 1.

1. Carbon steel plate (10) having the dimensions 855 mm $\times$ 550 mm $\times$ 12.15 mm conforming to BS 1501-224-440A and ground to a surface finish better than 120 micro-inches CLA (30 to 48 microns).

2. Commercially pure aluminium interlayer (12) having the dimensions 1000 mm $\times$ 600 mm $\times$ 1.65 mm conforming to BS 1470 Grade 1200.

3. Aluminium alloy plate (14) having the dimensions 1000 mm $\times$ 600 mm $\times$ 8.25 mm conforming to BS 1470 Grade 5083.

4. Explosive layer (16) consisting of 8.8 gm/cm$^2$ of a composition consisting of 80 parts of ammonium nitrate 20 parts of trinitrotoluene and 40 parts of sodium chloride, having a velocity of detonation of 2750 meters/sec loaded over the alloy plate 14.

The gap 13 between the steel and the interlayer was 3 mm and the gap 15 between the interlayer and the aluminium alloy plate was 25 mm, the gap spacing being obtained by spacer elements of 25 $\times$ 10 mm section polystyrene foam placed at 250 mm intervals on a square pitch.

After the explosive was detonated a section cut through the resulting composite in the direction of the detonation wave showed that the three metal layers were metallurgically bonded at the two interfaces with wavy bonds wherein the waves were synchronous in the two interfaces, the wave length being about 3 mm. As expected from the respective yield strengths of the materials, the wave amplitude at the alloy/interlayer interface was substantially greater than that at the steel-/interlayer interface. A standard test of a chisel driven into a saw cut at each interface did not cause any separation of the metal layers, demonstrating that the bonds were stronger than the weaker of the two parent materials.

A section was cut through a similar bonded composite made by the explosive bonding method used hitherto wherein the materials used were the same as those described for this example except that the pure aluminium interlayer 12 was 8.25 mm thick, the aluminium alloy plate 14 was 5.0 mm thick, the gap 13 was 15 mm and the gap 15 was 5 mm. The wavy bonds at the two interfaces were non-synchronous, the bond at the alloy/interlayer interface having a wavelength of 3 mm and that at the steel/interlayer interface having a wavelength of 5 mm.

Transition joints cut from the bonded composites prepared in this Example in accordance with the invention were stronger than corresponding joints made by the previous commercial method due to the reduced thickness of the weaker pure aluminium interlayer although the bond strengths were essentially the same in joints fabricated by either method.

EXAMPLE 2

The bonded metal composite was made as described in Example 1 except that the dimensions and spacing of the materials were:

(1) steel plate (11) was 850 mm×550 mm×19 mm;
(2) Aluminium interlayer (12) was 1000 mm×600 mm×2 mm
(3) Aluminium alloy plate 14 was 1000 mm×600 mm×15 mm
(4) Gap 13 was 3 mm;
(5) Gap 15 was 36 mm; and
(6) Explosive contained only 35 parts of sodium chloride and had a velocity of detonation of 2860 meters/sec. and the explosive-loading was 12.5 gm/cm$^2$.

As in Example 1 the bonded composite produced on detonation of the explosive had synchronous wavy bonds of equal wavelength at the two metal interfaces. The composite produced very strong transition joints.

I claim:

1. In a method of metallurgically bonding a composite laminar metal plate comprising a metal base layer, an outer metal layer and a metal interlayer, the said layers having different compositions and said outer layer and said interlayer having an elongation of at least 15%, said method comprising the steps of initially disposing the said layers substantially parallel to and separated from each other, the base layer being optionally supported on an anvil and being of a mass such that the combined mass of the base layer and the anvil (when present), is at least 4 times that of the combined mass of the outer layer and interlayer, disposing a layer of detonating explosive having a velocity of detonation in the range from 1500 to 3500 meters/sec. adjacent to the outer surface of the outer layer and detonating said explosive, thereby forming progressive collision fronts between the said layers moving at the velocity of the detonation, the improvement wherein said interlayer has a thickness of 0.25 to 4 mm and is initially disposed at a stand-off distance from the base layer not exceeding 6 mm and not exceeding 8 times the thickness of said interlayer and, said outer layer has a mass of at least twice the mass of said interlayer and is initially separated from said interlayer by a stand-off distance which is 0.5 to 10 times the thickness of said outer layer and is at least 3 times the stand-off distance between the base layer and said interlayer.

2. A method as claimed in claim 1 wherein the said interlayer is 1.5 to 3.0 mm thick.

3. A method as claimed in claim 1 wherein the stand-off distance between the base layer and the interlayer is in the range from 1.5 to 3.5 mm.

4. A method as claimed in claim 1 wherein the said outer layer is at least four times the thickness of the said interlayer.

5. A method as claimed in claim 1 wherein the metal layers comprise metal selected from the group consisting of aluminium, aluminium alloy, steel, titanium and silver.

6. A method as claimed in claim 1 wherein the base layer is a layer of carbon steel or a low alloy steel containing less than 5% alloying element by weight, the interlayer is a layer of aluminium or aluminium alloy having a yield strength not exceeding 17,000 psi, the outer layer is a layer of aluminium alloy having a yield strength exceeding 17,000 psi and the explosive has a velocity of detonation in the range from 2500 to 3400 meters/sec.; said interlayer having a thickness of 0.5 to 3.5 mm, and being initially disposed at a stand-off distance from the base layer in the range from 1.5 to 3.5 mm; and said outer layer being initially separated from said interlayer by a-stand-off distance which is 1 to 6 times the thickness of said outer layer.

7. A method as claimed in claim 6 wherein the said outer layer of aluminium alloy is 7 to 20 mm thick.

8. A method as claimed in claim 6 wherein the said stand-off distance between the said interlayer and the said outer layer of aluminium alloy is in the range from 20 to 50 mm.

9. A metallurgically bonded composite laminar metal plate whenever prepared by a method as claimed in any one of claims 1 to 8 inclusive.

10. An explosively bonded composite metal plate comprising a metal base layer, an outer metal layer and a metal interlayer, the three layers having different compositions; said outer layer having a mass at least twice that of said interlayer and said layers being metallurgically bonded at their interfaces with wavy bonds which are synchronous and of equal wavelength at both interfaces.

11. A composite metal plate as claimed in claim 10 wherein the metal layers comprise metals selected from the group consisting of aluminium, aluminium alloy, steel, titanium and silver.

12. A composite metal plate as claimed in claim 10 wherein the base layer is a layer of steel, the interlayer is a layer of aluminium or aluminium alloy having a yield strength not exceeding 17,000 psi, and the outer layer is a layer of aluminium alloy having a yield strength exceeding 17,000 psi.

* * * * *